US011676494B2

(12) United States Patent
Chung et al.

(10) Patent No.: US 11,676,494 B2
(45) Date of Patent: Jun. 13, 2023

(54) VESSEL COLLISION AVOIDING METHOD AND SYSTEM BASED ON ARTIFICIAL POTENTIAL FIELD

(71) Applicant: Ship and Ocean Industries R&D Center, New Taipei (TW)

(72) Inventors: Feng-Yeang Chung, New Taipei (TW); Chun-Han Chu, New Taipei (TW); Chi-Min Liao, New Taipei (TW); Mu-Hua Chen, Taipei (TW); Ling-Ji Mu, Taipei (TW); Li-Yuan Zhang, Taipei (TW); Sheng-Wei Huang, Taipei (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 589 days.

(21) Appl. No.: 16/827,700

(22) Filed: Mar. 23, 2020

(65) Prior Publication Data

US 2021/0295708 A1   Sep. 23, 2021

(30) Foreign Application Priority Data

Mar. 18, 2020   (TW) .................................. 109108858

(51) Int. Cl.
*G08G 3/02*       (2006.01)
*B63B 43/18*      (2006.01)
(Continued)

(52) U.S. Cl.
CPC ............. *G08G 3/02* (2013.01); *B63B 43/18* (2013.01); *B63B 49/00* (2013.01); *G01C 21/203* (2013.01); *G05D 1/0206* (2013.01)

(58) Field of Classification Search
CPC ...... G05D 1/02; G05D 1/0206; G01C 21/203; G08G 3/02; G08G 5/0086; B63B 49/00;
(Continued)

(56) References Cited

U.S. PATENT DOCUMENTS 10,948,300 B2 * 3/2021 Wang ................. G01C 21/3461
11,307,589 B2 * 4/2022 Chung ..................... G08G 3/02
(Continued)

FOREIGN PATENT DOCUMENTS

CN   105182975 A   12/2015
CN   105676871 A    6/2016
(Continued)

OTHER PUBLICATIONS

"Collision avoikdance and path planning methods" by Agnieszka Lazarowska, (Year: 2021).*
(Continued)

*Primary Examiner* — Cuong H Nguyen
(74) *Attorney, Agent, or Firm* — Cheng-Ju Chiang (57) ABSTRACT

The present invention discloses a vessel collision avoiding system and method based on Artificial Potential Field algorithm, the method comprises the following steps: (S1) obtaining a vessel information, at least one obstacle information and a target information; (S2) establishing an Artificial Potential Field (APF) by the vessel information, the at least one obstacle information and the target information, wherein the Artificial Potential Field comprises an attractive field of the target and a repulsive field of the obstacle; (S3) combining the attractive field and the repulsive field to obtain a first resultant force; (S4) Adding an external force to the Artificial Potential Field based on the vessel information or the obstacle information; (S5) combining the first resultant force and the external force to obtain a second resultant force; and (S6) the vessel sails in the direction of the second resultant force to avoid the obstacle.

21 Claims, 7 Drawing Sheets

(51) Int. Cl.
*B63B 49/00* (2006.01)
*G05D 1/02* (2020.01)
*G01C 21/20* (2006.01)

(58) Field of Classification Search
CPC ......... B63B 43/18; G01S 13/86; G01S 17/03; G01S 13/93
USPC ...... 342/41, 455; 349/903; 701/482, 457, 21
See application file for complete search history.

(56) References Cited

U.S. PATENT DOCUMENTS

2019/0360810 A1  11/2019  Johnson et al.
2020/0208983 A1* 7/2020  Wang ................. G01C 21/3461

FOREIGN PATENT DOCUMENTS

| CN | 105955268 | A |   | 9/2016  |              |
|----|-----------|---|---|---------|--------------|
| CN | 107918395 | A | * | 4/2018  | ........... G05D 1/0692 |
| CN | 207397097 | U | * | 5/2018  | ............... G05D 1/10 |
| CN | 109508016 | A | * | 3/2019  | ............... G05D 1/02 |
| CN | 109976189 | A | * | 7/2019  | ............... G05D 1/02 |
| CN | 110111880 | A | * | 8/2019  | ............. A61B 34/10 |
| CN | 110471427 | A | * | 11/2019 | ........... G05D 1/0206 |
| CN | 110471427 | A |   | 11/2019 |              |
| CN | 110609552 | A | * | 12/2019 | ........... G05D 1/0206 |
| CN | 110727274 | A | * | 1/2020  | ........... G05D 1/0206 |
| CN | 109460045 | B | * | 2/2022  | ........... G01C 21/203 |
| JP | 2017-151687 | A |  | 8/2017  |              |
| JP | 2021-146778 | A |  | 9/2021  |              |
| KR | 10-2018-0004182 | A | | 1/2018 |              |
| TW | 202010684 | A |   | 3/2020  |              |

OTHER PUBLICATIONS

"Ship trajectory planning for collision avoidance at sea" by Honnuang Lyu and Yong Yin, IEEE (Year: 2017).*
"Adaptive artificial potential field approach for obstacle avoidance path planning" by Li Ahou and Wei Li, IEEE (Year: 2014).*
J. Sun, J. Tang and S. Lao, "Collision Avoidance for Cooperative UAVs With Optimized Artificial Potential Field Algorithm," in IEEE Access, vol. 5, pp. 18382-18390, 2017, doi: 10.1109/ACCESS.2017.2746752.*
Souza RMJA, Lima GV, Morais AS, Oliveira-Lopes LC, Ramos DC, Tofoli FL. Modified Artificial Potential Field for the Path Planning of AircraftSwarms in Three-Dimensional Environments. Sensors (Basel). Feb. 17, 2022;22(4):1558. doi: 10.3390/s22041558. PMID: 35214462; PMCID: PMC8875449.*

* cited by examiner

(S11) detecting whether an obstacle enters a collision avoidance range of a vessel; performing step (S12) if the obstacle enters the collision avoidance range of the vessel; otherwise, remaining the navigation path of the vessel (S12) determining the obstacle is a static obstacle or a dynamic obstacle; performing step (S13) if the obstacle is the static obstacle; performing step (S14) if the obstacle is the dynamic obstacle (S13) avoiding the static obstacle by the first Artificial Potential Field algorithm (S14) determining whether to start avoiding the dynamic obstacle by a time to closest point of approach (TCPA) and distance to the closest point of approach (DCPA) of the vessel and the dynamic obstacle (S15) avoiding the dynamic obstacle according to a second vessel collision avoiding method

VESSEL COLLISION AVOIDING METHOD AND SYSTEM BASED ON ARTIFICIAL POTENTIAL FIELD

TECHNICAL FIELD

The present disclosure relates to a vessel collision avoiding system and method, more particularly to a vessel collision avoiding system and method.

DESCRIPTION OF THE RELATED ART

In light of the difficulty of ship collision risk profile and avoidance research as ship research field, which includes pass through A variety of passages perceive navigation channel information, and the characteristic behavior of ship under different Situation models is excavated based on many algorithms, then by real-time The fusion of data drives the ship itself to realize avoidance.

In recent years, the practice of Artificial Potential Field Method is widely used in terrestrial vehicle because of the simple model and convenience of calculation per se in the path planning. The core theory of Artificial Potential Field Method is to calculate the attractive field generated by the target point and the repulsive field generated by obstacles in environment. Therefore to create the integral field. However, disadvantages are found in practical application such as the endless loop movements. The endless loop movements usually occur in robot of the factory. On the other hand, if repulsive force generated by the obstacle approaches the terrestrial vehicle rapidly is too strong, or the direction of the terrestrial vehicle is coincidently the same as the direction of the integral force between the terrestrial vehicle and the obstacle, they may resulting in the terrestrial vehicle failing to escape from the moving obstacle via the endless loop movements.

In addition, the marine vehicles lack of braking system. Therefore the artificial potential field method has not been found to be used in the technical field of vessel collision avoidance.

SUMMARY

In order to solve the problems of related arts, the present invention discloses a vessel collision avoiding method based on Artificial Potential Field algorithm, the method comprises the following steps: (S1) obtaining a vessel information, at least one obstacle information and a target information; (S2) establishing an Artificial Potential Field (APF) by the vessel information, the at least one obstacle information and the target information, wherein the Artificial Potential Field comprises an attractive field of the target and a repulsive field of the obstacle; (S3) combining the attractive field and the repulsive field to obtain a first resultant force; (S4) adding an external force to the Artificial Potential Field algorithm based on the vessel information or the obstacle information; (S5) calculating the first resultant force and the external force to obtain a second resultant force; and (S6) the vessel sailing in the direction of the second resultant force to avoid the obstacle.

In another aspect, the present invention further discloses another vessel collision avoiding method based on Artificial Potential Field algorithm, the method comprises the following steps: (S11) detecting whether an obstacle enters a collision avoidance range of a vessel; performing step (S12) if the obstacle enters the collision avoidance range of the vessel; Otherwise, remaining the navigation path of the vessel; (S12) determining the obstacle is a static obstacle or a dynamic obstacle; performing step (S13) if the obstacle is the static obstacle; performing step (S14) if the obstacle is the dynamic obstacle; (S13) avoiding the static obstacle by the vessel collision avoiding method of APF algorithm; (S14) determining whether to start avoiding the dynamic obstacle by a time to closest point of approach (TCPA) and distance to the closest point of approach (DCPA) of the vessel and the dynamic obstacle; (S15) avoiding the dynamic obstacle according to a second vessel collision avoiding method of APF algorithm.

In another aspect, the present invention also discloses a vessel collision avoiding system based on Artificial Potential Field algorithm, comprising an information receiver configured to receive a vessel information, at least one obstacle information and a target information; a processor connected to the information receiver, the processor generates a navigation control command by a vessel collision avoiding method based on Artificial Potential Field (APF) algorithm; and a navigation controller connected to the processor, wherein the navigation controller controls the navigation of the vessel by the navigation control command.

The above summary of the present disclosure is to provide a basic description of the various aspects and features of the present disclosure. It is not a detailed description. Its purpose is not to specifically recite keys or critical elements of the present disclosure, and it is not intended to limit the scope of the present disclosure. It merely presents a few concepts of the present disclosure in a concise manner.

DESCRIPTION OF THE PREFERRED EMBODIMENTS

To clarify the purpose, technical solutions, and the advantages of the disclosure, embodiments of the present disclosure will now be described more fully hereinafter with reference to the accompanying drawings.

In order to navigate the vessel to avoid obstacles automatically while the vessel is sailing, the present invention discloses a vessel collision avoiding system and method based on Artificial Potential Field algorithm. Particularly, in addition to the general vessel with crew members controlling its navigation, the present invention further comprises unmanned vessel, such as self-driving vessel, autonomous control vessel, marine unmanned vehicle and surface automatic vehicle, etc., as well as the Maritime Autonomous Surface Ships (MASS) defined by International Maritime Organization (IMO). All navigation routes involving in automatic control of vessels or vehicles should fall within the scope.

Figure 1:
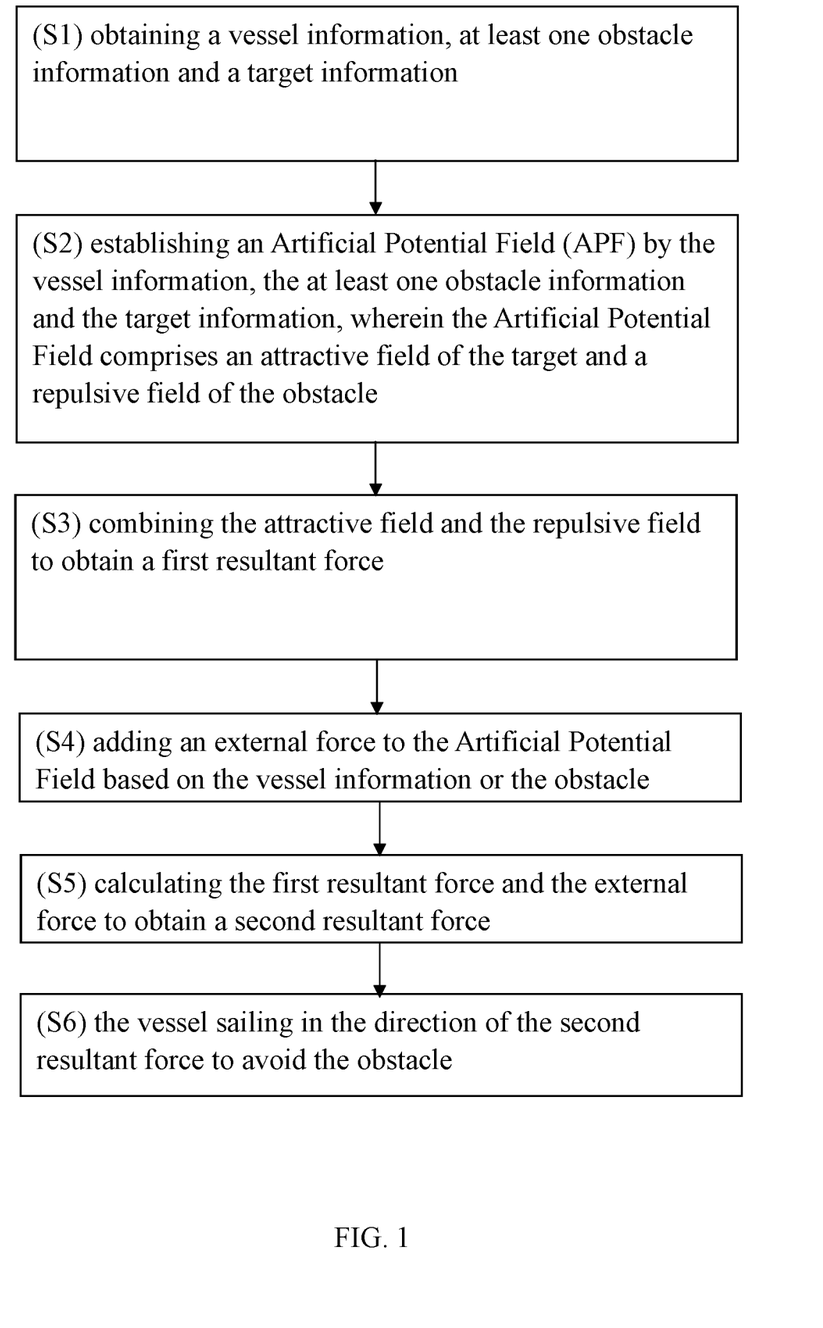

Referring to FIG. 1, FIG. 1 is a flowchart illustrating a vessel collision avoiding method based on Artificial Potential Field algorithm in accordance with one embodiment of the present disclosure. In this embodiment, the present invent improves the Artificial Potential Field (APF) algorithm to simulate the mutual exclusion and attraction of magnetic force, and constructs the collision avoidance rules according to the conditions such as the position and relative speed of the vessel and obstacles to avoid the obstacles in the sailing vessel.

As shown in FIG. 1, the method comprises the following steps: (S1) obtaining a vessel information, at least one obstacle information and a target information; (S2) establishing an Artificial Potential Field (APF) by the vessel information, the at least one obstacle information and the target information, wherein the Artificial Potential Field comprises an attractive field of the target and a repulsive field of the obstacle; (S3) combining the attractive field and the repulsive field to obtain a first resultant force; (S4) adding an external force to the Artificial Potential Field based on the vessel information or the obstacle information; (S5) calculating the first resultant force and the external force to obtain a second resultant force; and (S6) the vessel sailing in the direction of the second resultant force to avoid the obstacle.

In the step (S1), the vessel may obtain the vessel information of the vessel, the at least one obstacle information of the obstacle and the target information of the target by an information receiver in the vessel. Specifically, the information receiver comprises image collecting device, attitude sensing device, RADAR sensing device, LIDAR sensing device, sonar sensing device, wireless positioning device, automatic identification system (AIS) or a combination thereof. The vessel information comprises vessel speed, position, sailing direction, and hull length and width. The obstacle information comprises the obstacle speed, obstacle position, movement direction of the obstacle, obstacle size and the distance to the vessel. The target information comprises the position of the target and the distance to the vessel.

Except that the hull length and hull width are known information of the vessel, the vessel may obtain the vessel speed, sailing direction, the obstacle speed and the movement direction of the obstacle by the attitude sensing device. The vessel may also detect the obstacle speed, obstacle position, movement direction of the obstacle, obstacle size and the distance to the vessel, as well as the position of the target and the distance from the target to the vessel by image collecting device, RADAR sensing device, LIDAR sensing device, sonar sensing device. Moreover, the wireless positioning device of the vessel may obtain the position of the vessels, obstacles and the targets. If the obstacles are other sailing vessels, the vessel information of other vessels may be obtained through the automatic identification system (AIS), such as vessel speed, vessel position, sailing direction, and hull length and width of other vessels.

Figure 2:
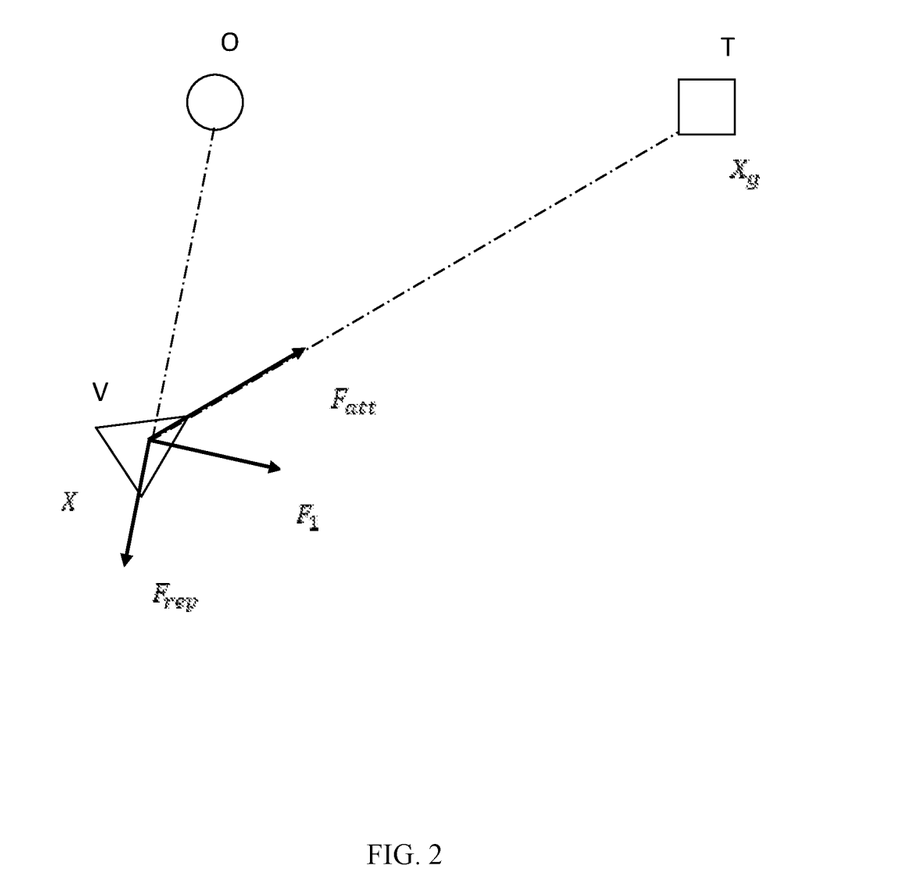

In steps (S2) to (S6), please refer to the FIG. 2 at the same time. The processor of the vessel may guide the vessel V to avoid obstacles O through an artificial potential field (APF) algorithm. The concept of the APF algorithm is to artificially construct the attractive force $F_{att}$ and repulsive force $F_{rep}$ of the potential field, to generate a navigation path that will not collide with obstacles, thus guiding the vessel to sail along with the path. Specifically, the method in step (S2) is establishing an Artificial Potential Field (APF) by the vessel information, the at least one obstacle information and the target information. The Artificial Potential Field further comprises an attractive field generated by the target and a repulsive field generated by the obstacle.

Specifically, the definition of the Artificial Potential Field (APF) is:

$$U = U_{att} + \Sigma U_{rep},$$

$U_{att}$ represents the attractive field and $U_{rep}$ represents the repulsive field.
Furthermore, the definition of the $U_{att}$ is:

$$U_{att} = \frac{1}{2}k(X - X_g)$$

k represents a first gain constant, X represent the vessel position and $X_g$ represents the target position. The definition of the $U_{rep}$ is:

$$U_{rep} = \begin{cases} 0, & \rho > \rho_0 \\ \frac{1}{2}k\left(\frac{1}{\rho} - \frac{1}{\rho_0}\right)^2 (X - X_g)^n, & \rho \leq \rho_0 \end{cases},$$

wherein k represents a second gain constant, n represents a number greater than 0, X represent the vessel position and $X_g$ represents the target position, $\rho$ represents a shortest distance from the vessel to the at least one obstacle and $\rho_0$ represents a longest distance at which the at least one obstacle produces repulsive force.

From the above definition, it is obvious that in the attractive field $U_{att}$ of the target point. When the vessel sails into the attractive region of the target point T, as the distance from the target T to the vessel V becomes smaller, the attractive force received by the vessel V gradually increases.

On the other hand, when the sailing vessel V detects the obstacles entering into the collision avoidance range (e.g. two to five times the circle drawn by the radius of the vessel) of the vessel V, the vessel will be affected by the repulsive field $U_{rep}$ of the obstacle O. As the distance from the obstacle O to the vessel V becomes smaller, the repulsive force received by the vessel V gradually increases. When the vessel V approaches the obstacle O indefinitely, the repulsive force $F_{rep}$ suffered by the vessel V tends to infinity, indicating a considerable risk of collision. Furthermore, as for the dynamic obstacle O, the moving speed and direction of the dynamic obstacle O must also be considered. For example, the greater the component of the speed of the obstacle O in the direction of the navigation speed of the vessel V, the vessel V is affected by the repulsive force of the obstacle O will increase accordingly. In addition, if the shortest distance between the vessel V and the at least one obstacle O is greater than the longest distance at which the obstacle generates a repulsive force; it means that the vessel V is not within the range of the repulsive field of the obstacle. Thus, the repulsive field $U_{rep}$ should be 0.

In the next step (S3), combining the attractive field and the repulsive field to obtain a compound potential field and generate a first resultant force. The definition of the first resultant force is:

$$F_1 = -\nabla(U_{att}) - \Sigma \nabla(U_{rep}) = F_{att} + \Sigma F_{rep},$$

$F_{att}$ represents an attractive force of the target and $F_{rep}$ represents a repulsive force of the at least one obstacle. So far, if the obstacle O is a static obstacle, the vessel V is navigated by the first resultant force $F_1$ to avoid the static obstacle and continue sailing toward the target. However, if the obstacle O is a dynamic obstacle, it would suddenly appear extremely close to the Vessel V (such as aquatic organisms suddenly swim out of the water surface), resulting in a sudden excessive repulsive force. Or the obstacle O is located exactly between the vessel V and the target T on the same axis, and the moving direction of the dynamic obstacle O is exactly the same as the direction of the first resultant force $F_1$ (resulting in the direction of the first resultant force $F_1$ still facing the obstacle). The aforementioned situation may cause the vessel V to always be unable to escape the obstruction of the obstacle O.

In the view of above reason, please refer to steps (S4) to (S6), which can be used to avoid the problems that the vessel is unable to be correctly guided to the target. Such as, the resultant force direction is the same as the obstacle position (or moving direction), the target is so close that the attraction is not enough, and the obstacles are too close resulting in excessive repulsion. The solution is to add a custom force to the target while the vessel is subjected to the repulsive force generated by the obstacle (meaning to generate a force in one direction toward the target point) to maintain the resultant force strength toward the target.

In step (S4), the method adds an external force to the Artificial Potential Field based on the ship information or the obstacle information. Specifically, the weight value of the external force $F_{ext}$ is determined by the vessel speed, hull length and width, and the movement speed of the dynamic obstacle, the size of the dynamic obstacle and the relative distance between the dynamic obstacle and the ship. When the moving speed of the dynamic obstacle or the speed of the vessel is faster, and when the relative distance between the dynamic obstacle and the ship is shorter, it means that the repulsive force from the dynamic obstacle will increase. In other words, a larger external force $F_{ext}$ is necessary to be directed to the target to avoid the repulsive force of the dynamic obstacle. Conversely, if the relative distance between the dynamic obstacle and the vessel is far, or the moving speed of the dynamic obstacle and the vessel speed are slow, it means that there is enough time to buffer. Thus, adding a small external force $F_{ext}$ to make the vessel bypass and avoid the obstacle with a slower speed and smaller angle.

In step (S5), the method combines the first resultant force and the external force to obtain a second resultant force. The second resultant force is defined as:

$$F_2 = F_1 + F_{ext}$$

$F_1$ represents the first resultant force and $F_{ext}$ represents the external force. In final step (S6), the vessel V may be guided by the second resultant force $F_2$ to avoid the at least one obstacle O and sail toward the target T. Thus, the unmanned vessel completes the navigation of the automatic collision avoidance.

In addition to considering the static and moving states of the obstacles, the artificial field potential algorithm is used to avoid these obstacles. The invention further solves the problems of that the vessel is unable to be correctly guided to the target. Such as, the resultant force direction is the same as the obstacle position (or moving direction), the target is so close that the attraction is not enough, and the obstacles are too close resulting in excessive repulsion. That is, the aforementioned vessel collision avoiding method may effectively avoid the probability of collision with the obstacle during the vessel sailing.

Figure 4:
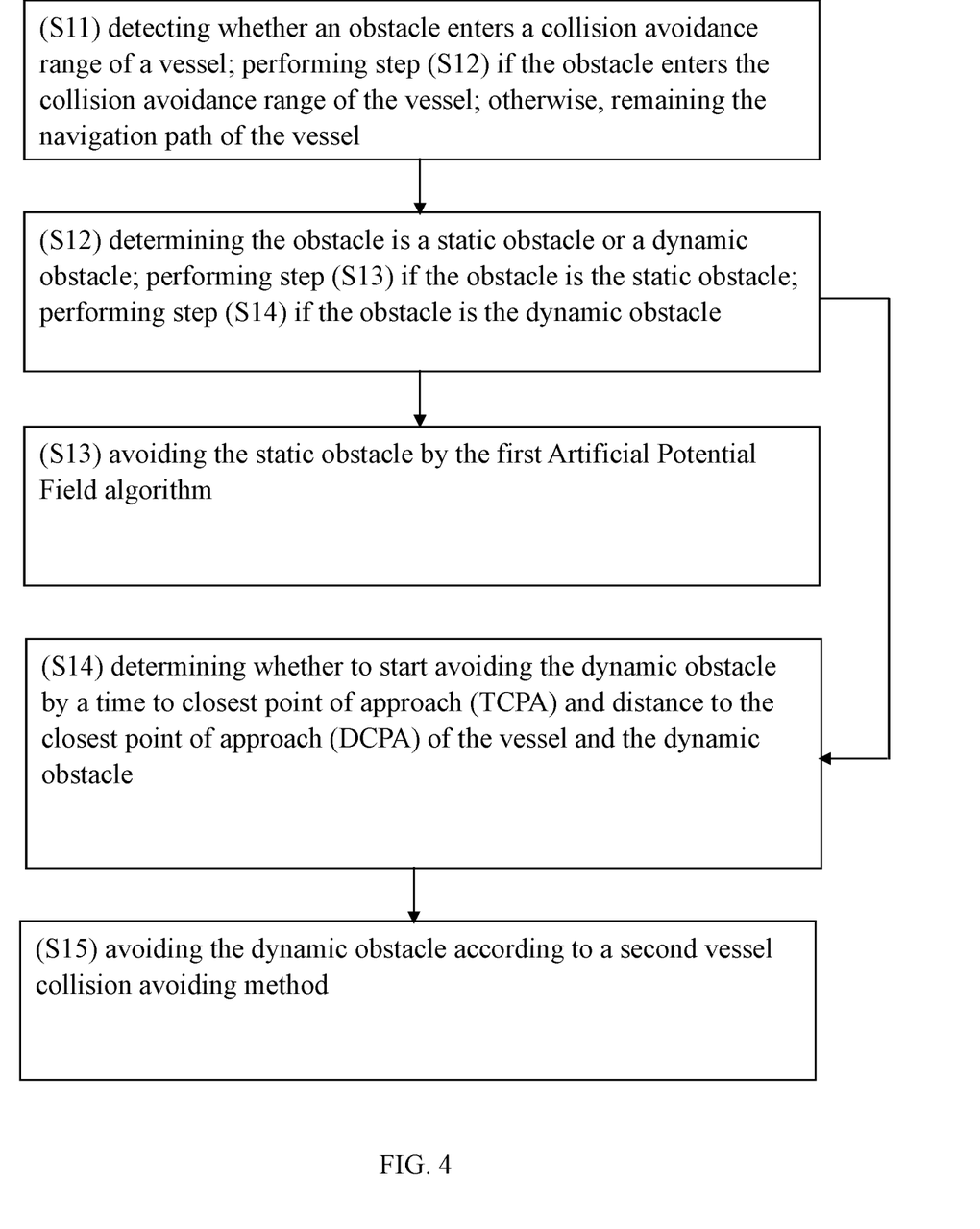

In addition, FIG. 4 shows another flowchart illustrating a vessel collision avoiding method based on Artificial Potential Field algorithm in accordance with second embodiment of the present disclosure. As shown FIG. 4, the another vessel collision avoiding method based on Artificial Potential Field algorithm comprises following steps: (S11) detecting whether an obstacle enters a collision avoidance range of a vessel; performing step (S12) if the obstacle enters the collision avoidance range of the vessel; Otherwise, remaining the navigation path of the vessel; (S12) determining the obstacle is a static obstacle or a dynamic obstacle; performing step (S13) if the obstacle is static; performing step (S14) if the obstacle is dynamic; (S13) avoiding the static obstacle by the vessel collision avoiding method of APF algorithm; (S14) determining whether to start avoiding the dynamic obstacle by a time to closest point of approach (TCPA) and distance to the closest point of approach (DCPA) of the vessel and the dynamic obstacle; (S15) avoiding the dynamic obstacle according to a second vessel collision avoiding method of APF algorithm.

In step (S11), the information receiver of vessel may detect whether an obstacle enters a collision avoidance range of a vessel. Specifically, the information receiver may obtain the vessel information and the target information, and detect the obstacle information of at least one obstacle. The information receiver comprises image collecting device, attitude sensing device, RADAR sensing device, LIDAR sensing device, sonar sensing device, wireless positioning device, automatic identification system (AIS) or a combination thereof. The vessel information comprises vessel speed, vessel position, sailing direction, hull length and width and length between perpendiculars (LPP) of vessel. The obstacle information comprises the obstacle speed, obstacle position, movement direction of the obstacle, obstacle size and the distance to the vessel. The target information comprises the position of the target and the distance from the target to the vessel.

In the abovementioned step, the information receiver may obtain the position of the obstacle and the distance from the obstacle to the vessel after detecting at least one obstacle. The processor then determines whether the obstacle enters a collision avoidance range of a vessel based on the position of the obstacle and the distance from the obstacle to the vessel. If the obstacle enters the collision avoidance range of the vessel, performing the next step (S12). Otherwise, the vessel V remains the original navigation path. Particularly, the collision avoidance range is generally set to the circumferential range drawn by a radius between 1 and 3 nautical miles. However, the collision avoidance range can be determined by vessel or obstacle in other cases, such as the size of the vessel, the speed of the vessel or the speed of the obstacle.

In next step (S12), the processor obtains the size and movement (static or dynamic) of the obstacle through the obstacle information detected by the information receiver. If the obstacle is a static obstacle such as reef, bridge pier or driftwood, performing the collision avoidance step of the static obstacle. On the other hand, if the obstacle is a dynamic obstacle, such as aquatic animals or other sailing vessel, the collision avoidance step of the dynamic obstacle will be executed.

In step (S13), the processor of vessel may calculate the path to avoid the static obstacle based on the first artificial field potential (AFP) algorithm, and then guide the vessel to avoid the static obstacle. In particular, the first AFP algorithm is establishing an Artificial Potential Field (APF) by the vessel information, the at least one obstacle information and the target information. The Artificial Potential Field further comprises an attractive field generated by the target and a repulsive field generated by the obstacle.

Specifically, the definition of the Artificial Potential Field (APF) is:

$$U = U_{att} + \Sigma U_{rep},$$

$U_{att}$ represents the attractive field and $U_{rep}$ represents the repulsive field. Furthermore, the definition of the $U_{att}$ is:

$$U_{att} = \frac{1}{2}k(X - X_g)$$

k represents a first gain constant, X represent the vessel position and $X_g$ represents the target position. The definition of the $U_{rep}$ is:

$$U_{rep} = \begin{cases} 0, & \rho > \rho_0 \\ \frac{1}{2}k\left(\frac{1}{\rho} - \frac{1}{\rho_0}\right)^2 (X - X_g)^n, & \rho \leq \rho_0 \end{cases},$$

wherein k represents a second gain constant, n represents a number greater than 0, X represent the vessel position and $X_g$ represents the target position, ρ represents a shortest distance from the vessel to the at least one obstacle and $ρ_0$ represents a longest distance at which the at least one obstacle produces repulsive force.

From the above definition, it shows that in the attractive field $U_{att}$ of the target point. When the vessel sails into the attractive region of the target point T, as the distance from the target T to the vessel V becomes smaller, the attractive force received by the vessel V gradually increases.

On the other hand, when the sailing vessel V detects the obstacles entering into the collision avoidance range (e.g. two to five times the circle drawn by the radius of the vessel) of the vessel V, the vessel will be affected by the repulsive field $U_{rep}$ of the obstacle O. As the distance from the obstacle O to the vessel V becomes smaller, the repulsive force received by the vessel V gradually increases. When the vessel V approaches the obstacle O indefinitely, the repulsive force $F_{rep}$ suffered by the vessel V tends to infinity, indicating a considerable risk of collision. Furthermore, as for the dynamic obstacle O, the moving speed and direction of the dynamic obstacle O must also be considered. For example, the greater the component of the speed of the obstacle O in the direction of the navigation speed of the vessel V, the vessel V is affected by the repulsive force of the obstacle O will increase accordingly. In addition, if the shortest distance between the vessel V and the at least one obstacle O is greater than the longest distance at which the obstacle generates a repulsive force; it means that the vessel V is not within the range of the repulsive field of the obstacle. Thus, the repulsive field $U_{rep}$ should be 0.

Moreover, the method of this embodiment combines the attractive field and the repulsive field to obtain a compound potential field and generate a first resultant force. The definition of the first resultant force is:

$$F_1 = -\nabla(U_{att}) - \Sigma\nabla(U_{rep}) = F_{att} + \Sigma F_{rep}$$

Figure 5:
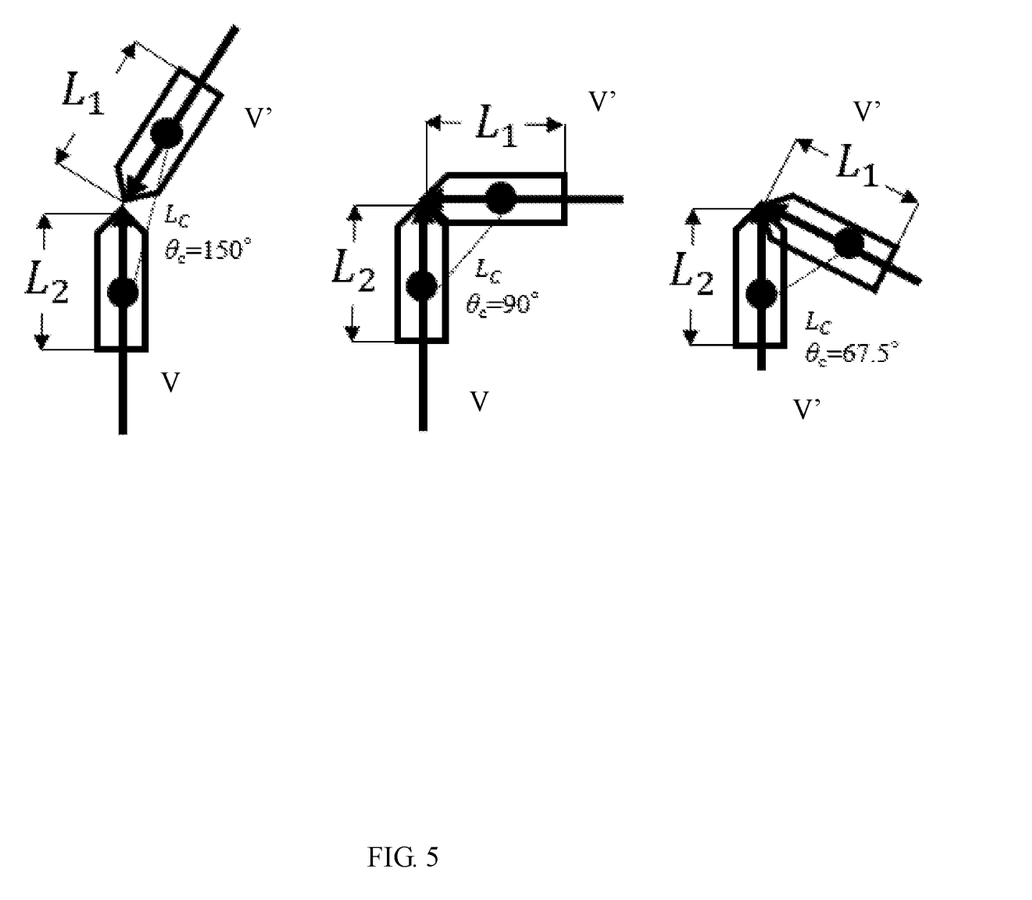

$F_{att}$ represents an attractive force of the target and $F_{rep}$ represents a repulsive force of the at least one obstacle. So far, if the obstacle O is a static obstacle, the vessel V is navigated by the first resultant force $F_1$ to avoid the static obstacle and continue sailing toward the target. In the step (S14), the processor of the vessel determines whether to start avoiding the dynamic obstacle according to a time to closest point of approach (TCPA) and distance to the closest point of approach (DCPA) of the vessel and the dynamic obstacle. When TCPA is greater than or equal to 0, it means that the vessel is approaching to the dynamic obstacle and includes a possibility of collision. When TCPA is TCPA less than 0, it indicates that the vessel and the dynamic obstacle are moving away from each other. On the other hand, referring to FIG. 5 simultaneously, DCPA is used to determine the shortest acceptable range for the vessel and the dynamic obstacles. When the DCPA is less than the safe range threshold, the collision avoidance mode is activated. The definition of the safe range threshold $ρ_0$ is:

$$ρ_0 = L_C + L = d_{cri}$$

$$L_C = 0.5 * \sqrt{L_1^2 + L_2^2 - 2 * L_1 * L_2 * \cos(X_C)}$$

The collision length $L_C$ (Collision Length) is the length of the line connecting the midpoints when two vessel V and V' collide. $L_1$ is the length of the vessel V' as a dynamic obstacle. $L_2$ is the length of vessel V of the vessel (the width is not considered here). $X_c$ is an angle $θ_c$ between the vessel V and the ship V' as the dynamic obstacle. L is the critical collision avoidance length (a variable parameter value), and critical collision avoidance length is considered the control ability of the vessel V which is at least three times length of the vessel V. In the final step (S15), the processor may calculate the may calculate a path to avoid the dynamic obstacle based on the second artificial field potential method, and guide the vessel to avoid the dynamic obstacle. If the obstacle is a dynamic obstacle, it would suddenly appear extremely close to the Vessel (such as aquatic organisms suddenly swim out of the water surface), resulting in a sudden excessive repulsive force. Or the obstacle is located exactly between the vessel and the target on the same axis, and the moving direction of the dynamic obstacle is exactly the same as the direction of the first resultant force (resulting in the direction of the first resultant force still facing the obstacle). The aforementioned situation may cause the vessel V to always be unable to escape the obstruction of the obstacle O. Therefore, the second artificial field potential algorithm disclosed in this embodiment adds an external force $F_{ext}$ to the artificial potential field according to the aforementioned vessel information or the dynamic obstacle information to maintain the resultant force strength toward the target point.

Specifically, the weight value of the external force $F_{ext}$ is determined by the vessel speed, hull length and width, and the movement speed of the dynamic obstacle, the size of the dynamic obstacle and the relative distance between the dynamic obstacle and the ship. When the moving speed of the dynamic obstacle or the speed of the vessel is faster, and when the relative distance between the dynamic obstacle and the ship is shorter, it means that the repulsive force from the dynamic obstacle will increase. In other words, a larger external force $F_{ext}$ is necessary to be directed to the target to avoid the repulsive force of the dynamic obstacle. Conversely, if the relative distance between the dynamic obstacle and the vessel is far, or the moving speed of the dynamic obstacle and the vessel speed are slow, it means that there is enough time to buffer. Thus, adding a small external force $F_{ext}$ to make the vessel bypass and avoid the obstacle with a slower speed and smaller angle.

In next step, the method combines the first resultant force and the external force to obtain a second resultant force. The second resultant force is defined as:

$$F_2 = F_1 + F_{ext}$$

$F_1$ represents the first resultant force and $F_{ext}$ represents the external force. In final step (S6), the vessel V may be guided by the second resultant force $F_2$ to avoid the at least one obstacle O and sail toward the target T. Thus, the unmanned vessel completes the navigation of the automatic collision avoidance.

Figure 6:
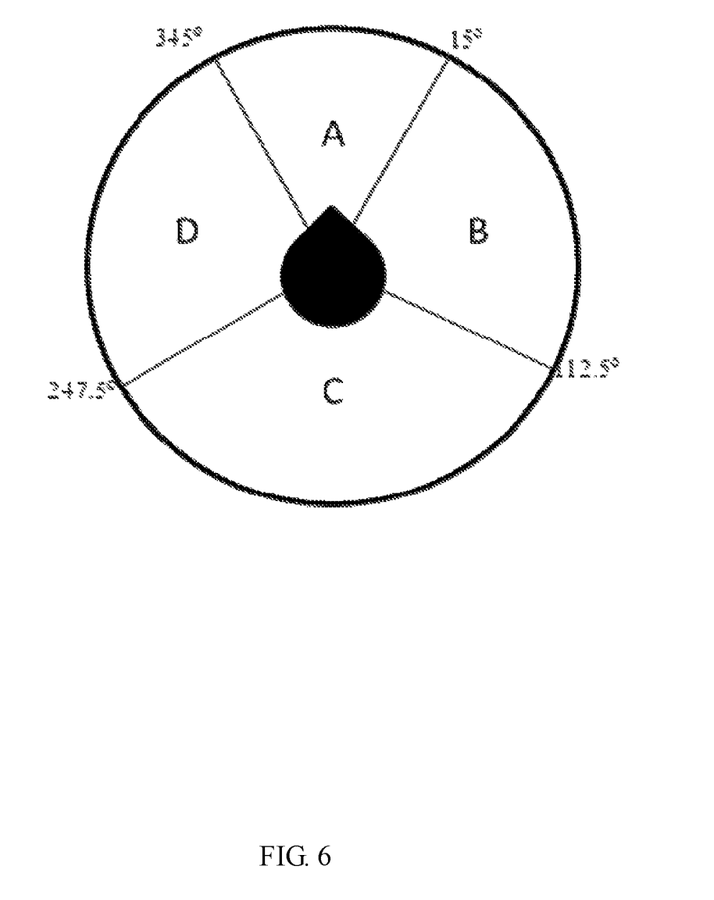

Particularly, there is a step (S14a) after the step (S14). In step (S14a), the method shows that dividing into a first zone, a second zone, a third zone and a fourth zone of the relative position of the dynamic obstacle and the vessel (as shown in FIG. 6) according to Convention on the International Regulations for Preventing Collisions at Sea (COLREGS). The first zone is the circle between 345° and 15° of the collision avoidance range, the second zone is the circle between 15° and 112.5° of the collision avoidance range, the third zone is the circle between 112.5° and 247.5° of the collision avoidance range and the fourth zone is the circle between 247.5° and 345° of the collision avoidance range.

Figure 3:
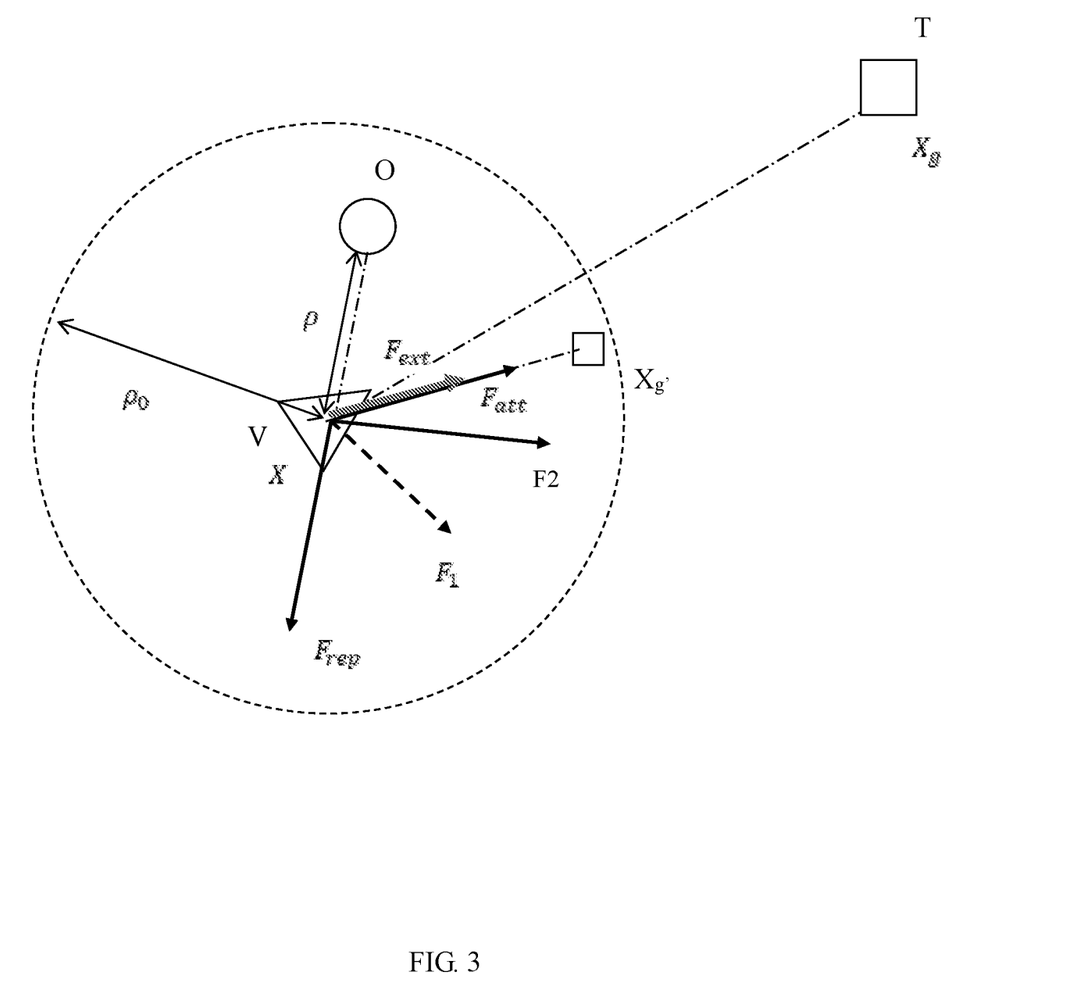

In this embodiment, the method, after the step (S14a), comprises a step (S14b) performing step (S15) if the dynamic obstacle located in the first and second zones, and remaining the navigation path of the vessel if the dynamic obstacle located in the third and fourth zone. As shown in FIG. 3, if the dynamic obstacle is located in the first zone, it means that an obstacle appears in front of the vessel. Therefore, it is necessary to establish a temporary attractive potential field in the artificial potential field that is shifted to the right according to the vessel's direction of advance and at a position that is twice the length of the hull, so as to meet the requirements of COLREGs. If the dynamic obstacle is located in the second zone, it means that there is an obstacle on the right side of the vessel. So that, it is also necessary to establish a temporary attractive potential field in the artificial potential field that is shifted to the right according to the vessel's direction of advance and at a position that is twice the length of the hull. If the dynamic obstacle is located in the third and fourth zones, indicating that the obstacle appears behind or on the left side of the vessel, then the obstacle could be ignored. Under the premise that the dynamic obstacles are other sailing vessels, other vessels should actively avoid our vessel to the right. On the contrary, our vessel should maintain the original path according to the international maritime collision avoidance convention.

The present invention improves the artificial potential field algorithm to simulate the mutual attraction and mutual exclusion of magnetic force. At the same time, the present invention combines COLREGS International Maritime Collision Avoidance Convention to establish a vessel collision avoidance method. Moreover, the method further based on the conditions such as vessel position and speed, obstacle position and speed, acceptable range of DCPA and detection distance to guide autonomous sailing vessels to avoid obstacles automatically.

Figure 7:
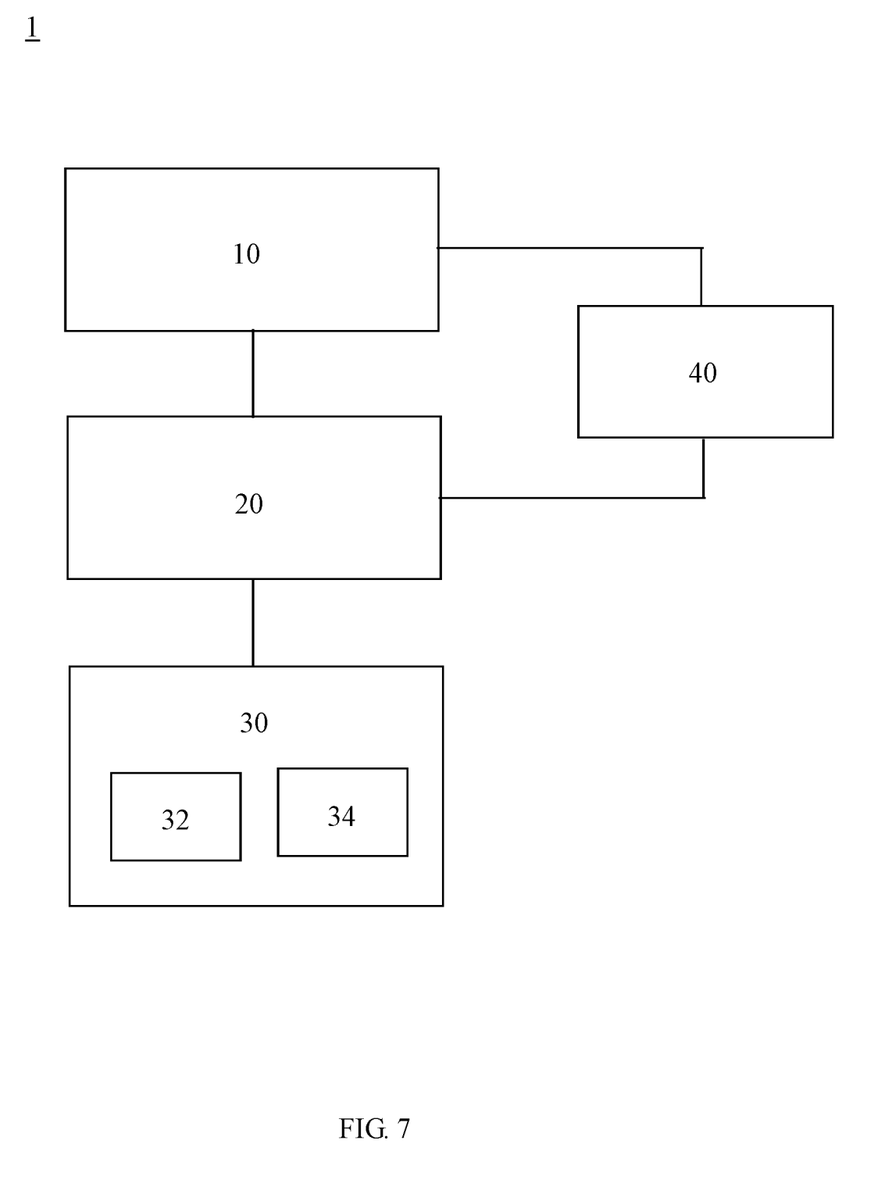

In addition, FIG. 7 is a schematic view illustrating a vessel collision avoiding system based on Artificial Potential Field algorithm in accordance with one embodiment of the present disclosure. As shown in FIG. 7, the vessel collision avoiding system 1 comprises an information receiver 10 configured to receive a vessel information, at least one obstacle information and a target information; a processor 20 connected to the information receiver 10, wherein the processor 20 generates a navigation control command by a vessel collision avoiding method based on Artificial Potential Field (APF); and a navigation controller 30 connected to the processor 20, the navigation controller 30 controls the navigation of the vessel by the navigation control command.

In addition to the general vessel with crew members controlling its navigation, the present invention further comprises unmanned vessel, such as self-driving vessel, autonomous control vessel, marine unmanned vehicle and surface automatic vehicle, etc., as well as the Maritime Autonomous Surface Ships (MASS) defined by International Maritime Organization (IMO). All navigation routes involving in automatic control of vessels or vehicles should fall within the scope.

The vessel collision avoidance system based on the artificial potential field method of the present invention will be further illustrated below. The information receiver 10 may obtain the vessel information and the target information, and detect the obstacle information of at least one obstacle. Specifically, The information receiver 10 comprises image collecting device, attitude sensing device, RADAR sensing device, LIDAR sensing device, sonar sensing device, wireless positioning device, automatic identification system (AIS) or a combination thereof. The vessel information comprises vessel speed, vessel position, sailing direction, hull length and width and length between perpendiculars (LPP) of vessel. The obstacle information comprises the obstacle speed, obstacle position, movement direction of the obstacle, obstacle size and the distance to the vessel. The target information comprises the position of the target and the distance from the target to the vessel.

Except that the hull length and hull width are known information of the vessel, the vessel may obtain the vessel speed, sailing direction, the obstacle speed and the movement direction of the obstacle by the attitude sensing device. The vessel may also detect the obstacle speed, obstacle position, movement direction of the obstacle, obstacle size and the distance to the vessel, as well as the position of the target and the distance from the target to the vessel by image collecting device, RADAR sensing device, LIDAR sensing device, sonar sensing device. Moreover, the wireless positioning device of the vessel may obtain the position of the vessels, obstacles and the targets. If the obstacles are other sailing vessels, the vessel information of other vessels may be obtained through the automatic identification system (AIS), such as vessel speed, vessel position, sailing direction, and hull length and width of other vessels.

The processer 20 which is connected to the information receiver 10 may generate a navigation control command by a vessel collision avoiding method based on Artificial Potential Field (APF) and the vessel information, the at least one obstacle information and the target information. The abovementioned vessel collision avoidance method of the artificial potential field method could be the vessel collision avoidance method illustrated in the FIG. 1, or the vessel collision avoidance method illustrated in the FIG. 4. Additionally, the navigation control command comprises a direction control command and a propulsion control command and a propulsion control command.

The navigation controller 30 connected to the processer 20 can control the navigation of the vessel according to the navigation control command. Specifically, the navigation controller 30 comprises a direction controller 32 and a propelling module 34. The direction controller 32 receives the aforementioned direction control command, and the propelling module 34 receives the aforementioned propulsion control command. In other words, the direction controller 32 connected to the processer 20 is configured to control (change the direction of the steering angle) a direction of the vessel according to the direction control command. On the other hand, the propelling module 34 connected to the processor 20 is configured to control the speed of the vessel according to the propulsion control command. Therefore, the vessel may be able to follow a trajectory of the predetermined collision avoiding path to avoid the obstacle.

In this embodiment, the processor 20 may be a programmable logic controller (PLC), a microcontroller unit (MCU) or a combination thereof. However, the device which is able to receive the information transmitted from each module and to transmit the control command after processing should within the scope, and the present disclosure is not limited thereto.

In this embodiment, the processor 20 may be a programmable logic controller (PLC), a microcontroller unit (MCU) or a combination thereof. However, the device which is able to receive the information transmitted from each module and to transmit the control command after processing should within the scope, and the present disclosure is not limited thereto.

In addition, the system 1 of present invention may further include an information security module 40 connected to the processor 20 and/or the information receiver 10. The information security module 40 is configured to provide the vessel with a security protection mechanism when the processor 20 receives incorrect information or the information receiver 10 has a connection problem. If external information is not able to be received due to the connection problem of the information receiver 10, or the information receiver 10 is interfered or a third-party user, such as a malicious program or a virus, improperly controls operations of the processor 20, the information security module 40 may automatically set the vessel to neutral and prohibit the wireless communicator of the vessel from receiving the external information or commands, so as to prevent collision accidents. Such that staffs may board the vessel for maintenance safely.

The information security module 40 is configured to monitor wireless communication transmission via an intrusion-detection system (IDS). The information security module 40 is configured to determine whether there is any suspicious activity or any vessel which violates the navigation regulations, and to activate an alarm or transmit an active response upon determining. The information security module 40 may further include an authentication system, such that only the users who pass identity verification is authorized (such as shared key or biometric authentication) to communicate with the vessel. The information security module 40 may further include a firewall system established between an external device and the wireless communicator. The firewall system is configured to monitor and block inappropriate external information according to pre-defined protected content. The information security module 40 may further include a whitelisting system or an application whitelisting configured to execute the listed modules or applications, and the applications not on the list may not be allowed to execute. In other words, the information security module 40 may only allow the transmission and the execution of the modules and the applications configured within the vessel collision avoiding system 1. When a module or an application outside of the list appears, the vessel collision avoiding system 1 may not execute the module or the application, and may activate a warning immediately. The whitelisting system is configured to protect the vessel collision avoiding system 1 at the front line to prevent the vessel collision avoiding system 1 from an intrusion of malware to interfere the vessel.

The present invention provides a reliable and safe method for the field of autonomous navigation and collision avoidance by considering both static obstacles and dynamic obstacles. Moreover, the present determines whether the obstacle with the danger of collision based on the shortest distance between the vessel and the obstacle in the coordinate system. Therefore, the vessel may avoid obstacles smoothly and maintain the path to the target in the navigation. In addition, the present system controls the speed and course of the vessel during obstacle avoidance. The vessel collision avoidance method and system based on the artificial potential field algorithm of the present invention can greatly reduce the probability of collision with obstacles, and can also be an important role in the field of autonomous ship obstacle avoidance due to its easy timely control and small amount of calculation.

The above description is merely the embodiments in the present invention, the claim is not limited to the description thereby. The equivalent structure or changing of the process of the content of the description and the figures, or to implement to other technical field directly or indirectly should be included in the claim. All other embodiments obtained by a person of ordinary skill in the art based on the embodiments of the present disclosure without creative efforts shall fall within the protection scope of the present disclosure.

What is claimed is:

1. A vessel collision avoiding system based on Artificial Potential Field (APF) algorithm, comprising:
   an information receiver configured to receive a vessel information, at least one obstacle information and a target information;
   a processor connected to the information receiver, wherein the processor generates a navigation control command via a vessel collision avoiding method which is based on the Artificial Potential Field (APF) algorithm; and
   a navigation controller connected to the processor, wherein the navigation controller controls navigation of a vessel by the navigation control command;
   wherein the definition of the Artificial Potential Field is:

$U=U_{att}+\Sigma U_{rep}$;

wherein the $U_{att}$ represents the attractive field and the $U_{rep}$ represents the repulsive field;
   wherein the definition of the $U_{att}$ is:

$$U_{att} = \frac{1}{2}k(X - X_g);$$

wherein the k represents a first gain constant, the X represent the vessel position and the $X_g$ represents the target position.

2. The vessel collision avoiding system according to claim 1, wherein the information receiver comprises image collecting device, attitude sensing device, RADAR sensing device, LIDAR sensing device, sonar sensing device, wireless positioning device, automatic identification system (AIS) or combination thereof.

3. The vessel collision avoiding system according to claim 1, wherein the processor comprises Programmable Logic Controller (PLC), Microcontroller Unit (MCU) or combination thereof.

4. The vessel collision avoiding system according to claim 1, wherein the navigation controller comprises a direction controller and a propelling module.

5. The vessel collision avoiding system according to claim 4, wherein the direction controller comprises a rudder, an electronic steering system or combination thereof.

6. The vessel collision avoiding system according to claim 4, wherein the propelling module comprises a generator, an engine, a thruster, a throttle, a battery, a motor or combinations thereof.

7. The vessel collision avoiding system according to claim 1, wherein the vessel collision avoiding system further comprises an information security module which is connected to the processor and the information receiver.

8. The vessel collision avoiding system according to claim 1, wherein the information security module comprises an intrusion-detection system (IDS), an authentication, an authorization and encryption system, a firewall system, a whitelisting system or combinations thereof.

9. A vessel collision avoiding method based on Artificial Potential Field (APF) algorithm, comprising the following steps:
   (S1) obtaining a vessel information, at least one obstacle information and a target information;
   (S2) establishing an Artificial Potential Field (APF) by the vessel information, the at least one obstacle information and the target information, wherein the Artificial Potential Field comprises an attractive field of the target and a repulsive field of the obstacle;

(S3) combining the attractive field and the repulsive field to obtain a first resultant force;

(S4) adding an external force to the Artificial Potential Field based on the vessel information or the obstacle information;

(S5) calculating the first resultant force and the external force to obtain a second resultant force; and (S6) the vessel sailing in the direction of the second resultant force to avoid the obstacle;

wherein the definition of the Artificial Potential Field is:

$$U = U_{att} + \Sigma U_{rep};$$

wherein the $U_{att}$ represents the attractive field and the represents the repulsive field;

wherein the definition of the $U_{att}$ is:

$$U_{att} = \frac{1}{2}k(X - X_g);$$

wherein the k represents a first gain constant, the X represent the vessel position and the $X_g$ represents the target position.

10. The vessel collision avoiding method according to claim 9, wherein the vessel information comprises the speed, position, sailing direction, hull length and hull width of the vessel.

11. The vessel collision avoiding method according to claim 9, wherein the obstacle information comprises speed, position, moving direction, size and distance ranged from the vessel of the obstacle.

12. The vessel collision avoiding method according to claim 9, wherein the target information comprises the position and the distance ranged from the vessel of the target.

13. A vessel collision avoiding method based on Artificial Potential Field (APF) algorithm, comprising the following steps:

(S11) detecting whether an obstacle enters a collision avoidance range of a vessel; performing step (S12) if the obstacle enters the collision avoidance range of the vessel; otherwise, remaining a navigation path of the vessel;

(S12) determining the obstacle is a static obstacle or a dynamic obstacle; performing step (S13) if the obstacle is the static obstacle; performing step (S14) if the obstacle is the dynamic obstacle;

(S13) avoiding the static obstacle by a first Artificial Potential Field algorithm;

(S14) determining whether to start avoiding the dynamic obstacle by a time to closest point of approach (TCPA) and distance to the closest point of approach (DCPA) of the vessel and the dynamic obstacle; and (S15) avoiding the dynamic obstacle according to the vessel collision avoiding method as claimed in claim 9.

14. The vessel collision avoiding method according to claim 13, wherein the vessel starts to avoid the dynamic obstacle if the DCPA less than a safe threshold, wherein the safe threshold is determined by hull length, vessel speed and obstacle speed.

15. The vessel collision avoiding method according to claim 9, wherein the definition of the $U_{rep}$ is:

$$U_{rep} = \begin{cases} 0, & \rho > \rho_0 \\ \frac{1}{2}k\left(\frac{1}{\rho} - \frac{1}{\rho_0}\right)^2 (X - X_g)^n, & \rho \leq \rho_0 \end{cases}$$

wherein the k represents a second gain constant, the n represents a number greater than 0, the X represent the vessel position and the $X_g$ represents the target position, the $\rho$ represents a shortest distance from the vessel to the at least one obstacle and the $\rho_0$ represents a longest distance at which the at least one obstacle produces repulsive force.

16. The vessel collision avoiding method according to claim 15, wherein the definition of the first resultant force is:

$$F_1 = -\nabla(U_{att}) - \Sigma\nabla(U_{rep}) = F_{att} + \Sigma F_{rep}$$

wherein the $F_{att}$ represents an attractive force of the target and the $F_{rep}$ represents a repulsive force of the at least one obstacle.

17. The vessel collision avoiding method according to claim 16, wherein the definition of the second resultant force is:

$$F_2 = F_1 + F_{ext}$$

wherein the $F_1$ represents the first resultant force and the $F_{ext}$ represents the external force.

18. The vessel collision avoiding method according to claim 14, wherein the safe threshold affected by an external parameter, where in the external parameter comprises the obstacle size and the relative velocity between the vessel and obstacle.

19. The vessel collision avoiding method according to claim 13, after the step (S14), further comprising a step (S14a) dividing into a first zone, a second zone, a third zone and a fourth zone of the relative position between the dynamic obstacle and the vessel according to COLREGS.

20. The vessel collision avoiding method according to claim 19, after the step (S14a), further comprising a step (S14b) performing step (S15) if the dynamic obstacle located in the first and second zones; and remaining the navigation path of the vessel if the dynamic obstacle located in the third and fourth zone.

21. The vessel collision avoiding method according to claim 20, wherein the first zone is the circle between 345° and 15° of the collision avoidance range, the second zone is the circle between 15° and 112.5° of the collision avoidance range, the third zone is the circle between 112.5° and 247.5° of the collision avoidance range and the fourth zone is the circle between 247.5° and 345° of the collision avoidance range.

* * * * *